(12) United States Patent
Zhang et al.

(10) Patent No.: US 9,033,615 B2
(45) Date of Patent: May 19, 2015

(54) FLEXIBLE PIPELINE FOR OIL AND GAS TRANSPORTATION STABILIZED ON SEABED BY ANCHORAGE PIER

(75) Inventors: Aihui Zhang, Hangzhou (CN); Dadi Zhang, Vancouver (CA); Xiu Zhang, Shenzhen (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 0 days.

(21) Appl. No.: 14/124,670

(22) PCT Filed: Jun. 6, 2012

(86) PCT No.: PCT/CN2012/076495
§ 371 (c)(1),
(2), (4) Date: Dec. 6, 2013

(87) PCT Pub. No.: WO2012/167717
PCT Pub. Date: Dec. 13, 2012

(65) Prior Publication Data
US 2014/0116559 A1    May 1, 2014

(30) Foreign Application Priority Data
Jun. 9, 2011  (CN) .......................... 2011 1 0153354

(51) Int. Cl.
*F16L 3/26*    (2006.01)
*F16L 1/12*    (2006.01)
*F16L 1/16*    (2006.01)

(52) U.S. Cl.
CPC . *F16L 3/26* (2013.01); *F16L 1/123* (2013.01); *F16L 1/16* (2013.01)

(58) Field of Classification Search
CPC ................. F16L 1/14; F16L 1/20; F16L 1/24; F16L 1/201; F16L 3/00; F16L 3/26
USPC .......................................... 405/172; 138/106
See application file for complete search history.

(56) References Cited

U.S. PATENT DOCUMENTS

| | | | | |
|---|---|---|---|---|
| 2,395,745 | A * | 2/1946 | King ............................. | 285/367 |
| 3,849,997 | A * | 11/1974 | Gower .......................... | 405/171 |
| 4,059,872 | A | 11/1977 | Delesandri | |
| 4,310,264 | A * | 1/1982 | Brownlee ..................... | 405/172 |
| 8,100,606 | B2 * | 1/2012 | Brown et al. ................. | 405/171 |

* cited by examiner

*Primary Examiner* — Tara M. Pinnock
(74) *Attorney, Agent, or Firm* — Jacobson Holman PLLC; Jiwen Chen

(57) ABSTRACT

The invention discloses a flexible offshore pipeline for oil and gas transportation stabilized on seabed by anchorage piers. It comprises cable (1) and flexible pipe (2) for oil and gas transportation, anchorage pier assemblies (3) to prevent the cable from drifting, and constraining assemblies (4) to restrict the flexible pipe (2) are sequentially provided on the cable. The anchorage pier assembly (3) comprises a gravity block (31) and the first clamping tool (32), and the first clamping tool (32) connects with the cable (1). The invention uses the flexible pipe (2) to build up offshore pipeline for oil and gas transportation, and anchorage pier assembly (3) and constraining assembly (4) for constraining the flexible pipe (2) are sequentially provided on the cable (1), which can restrict the flexible pipe, achieve reliable oil and gas transportation and prevent the flexible pipe drifting on the seabed. The pipeline system can protect the flexible pipe, are strong and reliable and the cost of pipeline is low. It also has the advantages of being safe and easy and fast to installation.

4 Claims, 3 Drawing Sheets

FLEXIBLE PIPELINE FOR OIL AND GAS TRANSPORTATION STABILIZED ON SEABED BY ANCHORAGE PIER

This is a U.S. national stage application of PCT Application No. PCT/CN2012/076495 under 35 U.S.C. 371, filed Jun. 6, 2012 in Chinese, claiming the priority benefit of Chinese Application No. 201110153354.6, filed Jun. 9, 2011, which is hereby incorporated by reference.

TECHNOLOGY FIELD

The present invention relates to an offshore oil and gas development operation system, in particular to a type of submarine crude oil and oil gas transportation flexible pipeline system.

BACKGROUND OF THE TECHNOLOGY

As oil and gas resources of onshore and shallow water area are getting scarce, oil and gas resources mining and development in deep water areas have become the target of ocean energy development. Large offshore oil and gas fields discovered recently are mostly located in deep water areas, and the world's offshore oil and gas resources exploration is accelerating towards the deeper water areas. Offshore pipeline is one of the key structures for oil and gas development in deep water areas, as the water depth of oil and gas field is getting deeper and deeper, the design, construction and management of traditional steel pipeline become more and more difficult, and the cost is becoming higher and higher.

DESCRIPTION OF THE INVENTION

The present invention is to solve the problem of providing a safe, reliable, easy construction, high installation speed and low cost offshore flexible pipeline for oil and gas transportation.

In order to solve the problem, the technical solution of the present invention is as follow: A flexible offshore pipeline for oil and gas transportation is stabilized on seabed by anchorage pier. It comprises cable and flexible pipes for oil and gas transportation. On the cable, it is provided with anchorage pier assembly to prevent the cable from moving, and constraining assembly to constrain the flexible pipe.

As a further improvement of the technical solution of the present invention, the anchorage pier assembly comprises a first clamping tool and gravity blocks. The first clamping tool connects with the cable and is fixed on the gravity blocks. The gravity blocks are directly placed on the seabed.

The constraining assembly comprises a constraining belt and the second clamping tools placed on two ends of the belt. The second clamping tool has fixture grooves at the ends, and the cable is clamped and mounted into the fixture grooves. The flexible pipe is sleeved within the constraining belt, whose head and tail are connected with the cable.

There are flexible pipe connectors on the ends of the flexible pipe. The flexible pipe connector comprises a connecting pipe and reinforcing hoops with bolts. The flexible pipe is sleeved onto the connecting pipe, and the reinforcing hoops surround the flexible pipe and the connecting pipe. There is a flange at the exit end of the connecting pipe for flexible pipe connecting.

The present invention has the following advantages:

1. The present invention uses the flexible pipe to achieve oil and gas transportation, and on the cable there are anchorage pier assembly and flexible pipe constraining assembly to effectively constrain the flexible pipe, achieve reliable oil and gas transportation, and prevent the flexible pipe significantly moving and drifting on the seabed. The pipeline system is safe, reliable and the cost of pipeline is low.

2. The present invention uses the flexible pipe to achieve oil and gas transportation. The flexible pipe in the system has a low weight. There is no need for corrosion prevention treatment. The flexible pipe is foldable and is able to be coiled on the drum. The flexible pipe will not happen to buckle or be destroyed due to sea water pressure during the installation. There are fewer joints, and a high installation speed. While the flexible pipeline is transporting oil and gas, some of the internal pressure of the pipe can be balanced by external sea water pressure, so that the stress on the wall of the pipe can be reduced and the material of the pipe can be less. While the flexible pipeline is transporting oil and gas, the weight of the oil and gas in the pipe is lighter than the water, so that the oil and gas in the pipe can get buoyancy from the seawater, the oil and the gas have the trend to move upward due to the buoyancy, and this can reduce the work pressure in the pipeline.

3. Because both the flexible pipe and the cable of the present invention are flexible structures, the action on the pipe due to the earthquake will always be very small.

Figure 1:
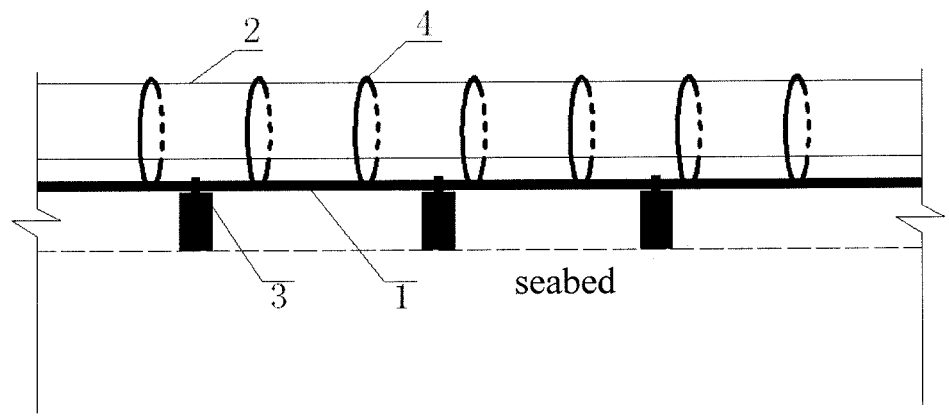
FIG. 1 is a schematic structural view of the flexible pipeline according to embodiments of the present invention.

THE EXPLANATION OF THE REFERENCE NUMERALS 1) cable; 2) flexible pipe; 21) flexible pipe connector; 211) connecting pipe; 212) flange; 213) reinforcing hoop; 3) anchorage pier assembly; 31) gravity block; 32) first clamping tool; 4) constraining assembly; 41) constraining belt; 42) second clamping tool; 421) fixture groove; 5) cable water entry control pulley; 6) flexible pipe control winch; 7) cable control winch.

DETAILED DESCRIPTION OF AN EMBODIMENT

Figure 2:
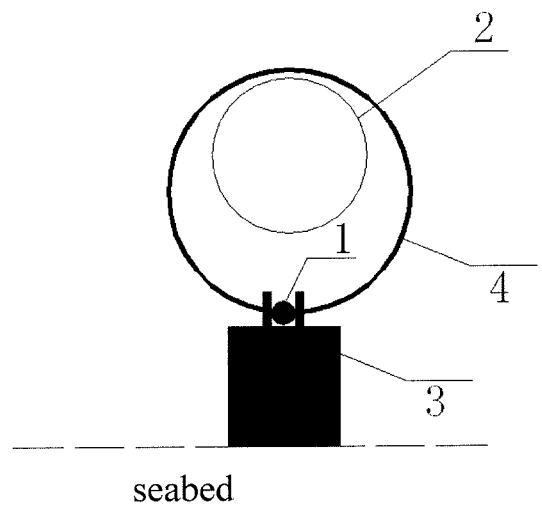
FIG. 2 is a schematic cross-section view of the flexible pipeline according to embodiments of the present invention.
Figure 3:
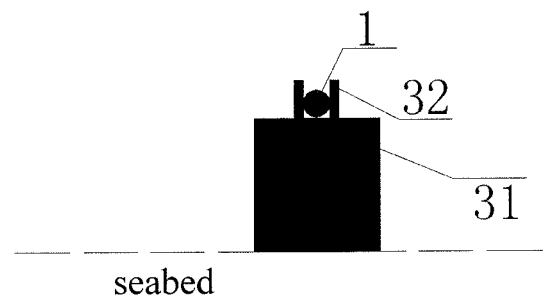
FIG. 3 is a schematic structural view of the anchorage pier assembly according to embodiments of the present invention.

As shown in FIG. 1 and FIG. 2, the flexible offshore pipeline for submarine oil and gas transportation comprises a cable 1 and a flexible pipe 2 for oil and gas transportation. On the cable, it is sequentially provided with an anchorage pier assembly 3 to prevent the cable and pipe from drifting, and the constraining assembly 4 to constrain the flexible pipe 2. As shown in FIG. 3, the anchorage pier assembly 33 comprises a gravity block 31 and a first clamping tool 32. The first damping tool 32 connects to the cable 1, and the gravity block 31 is directly placed on the seabed. The structure is simple and reliable.

Figure 4:
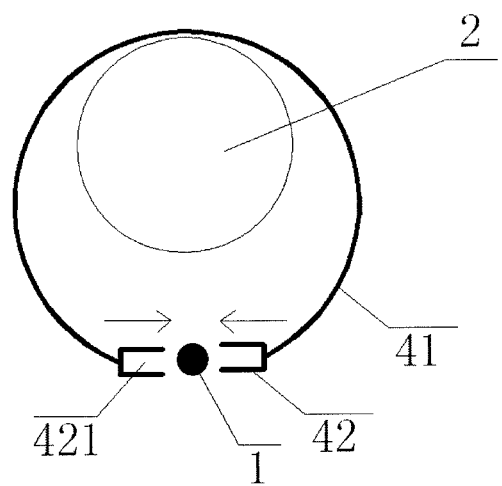
FIG. 4 is a schematic structural view of the constraining assembly according to embodiments of the present invention.

As shown in FIG. 4, the constraining assembly 4 comprises a belt 41 and the second clamping tools 42 that are provided on two ends of the belt 41. The second clamping tools 42 have fixture grooves 421 at the ends, and the constraining assembly 4 is fixed on the cable 1 through the fixture grooves 421. The flexible pipe 2 sleeved within the constraining belt 4, whose both ends (head and tail) are connected with the cable 1. The structure of the constraining assembly 4 is simple and the cost is low. It can achieve reliable constraining to the flexible pipe 2 without damaging the flexible pipe 2. Prior to clamping and mounting to the cable 1, the constraining assembly 4 are belt-shaped objects with the second clamping tool 42 at the two ends. In use, a second clamping tool is clamped and mounted to the cable 1, and then the constraining belt 41 is sleeved onto and surrounds the flexible pipe 2. Finally, another second clamping tool 42 is clamped and mounted on the cable 1. Thus, the installation of the constraining assembly 4 is completed.

Figure 5:
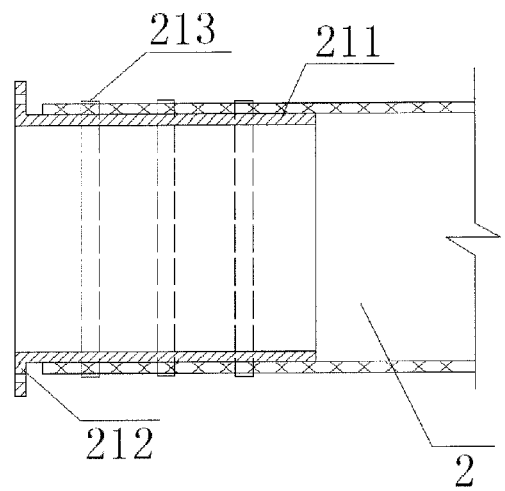
FIG. 5 is a schematic structural view of the flexible pipe connector according to embodiments of the present invention.

As shown in FIG. 5, there are flexible pipe connectors 21 at the ends of the flexible pipe 2. The flexible pipe connector 21 comprises a connect pipe 211 and reinforcing hoops 213 with bolts. The flexible pipe 2 is sleeved and bonded onto the connect pipe 211, and the reinforcing hoops 213 surround the joint area of the flexible pipe 2 and the connect pipe 211. There is a flange 212 at the exit end of the connect pipe 211 for flexible pipe connecting. Flexible pipe connectors 21 can be used to connect the flexible pipe 2 with another type of pipe. For example, it can be used to connect the flexible pipe to the oil producing equipments under water or above water. The flexible pipe connectors 21 can also be used to lengthen the flexible pipe. The connector is strong and reliable enough to effectively bear the pulling force on the flexible pipe during installation. In this embodiment, the flexible pipe 2 is bonded and sleeved on the connect pipe 211 to form sealed connection, so that the sealing performance of the pipe is reliable. There are bolt holes on the flange 212 for connecting flexible pipe to other equipment through bolts.

In this embodiment, the cable 1 is a steel cable. In other cases, the cable can be made of by other kinds of materials, and the number of the cables can be two or more. The flexible pipe 2 is formed by enmeshing high strength fiber on the plastic material. The high strength fiber can be carbon fiber, glass fiber, aramid fiber as well as other kinds of fiber. The flexible pipe can also be plastic pipe or rubber pipe. The constraining assembly 4 can be the shape different from FIG. 4, as long as it can restrict the flexible pipe 2. The constraining belt 41 can be steel band, steel rope, steel wire or other kind of rope made of fiber. In this embodiment, the gravity block 31 is concrete block. In other cases, the gravity block can be any other object that can provide weight and can be fixed on the cable by the first clamping tool. In this embodiment, the steel materials contacting the sea water can be treated to be resistant to corrosion through coating or cathodic protection.

Figure 6:
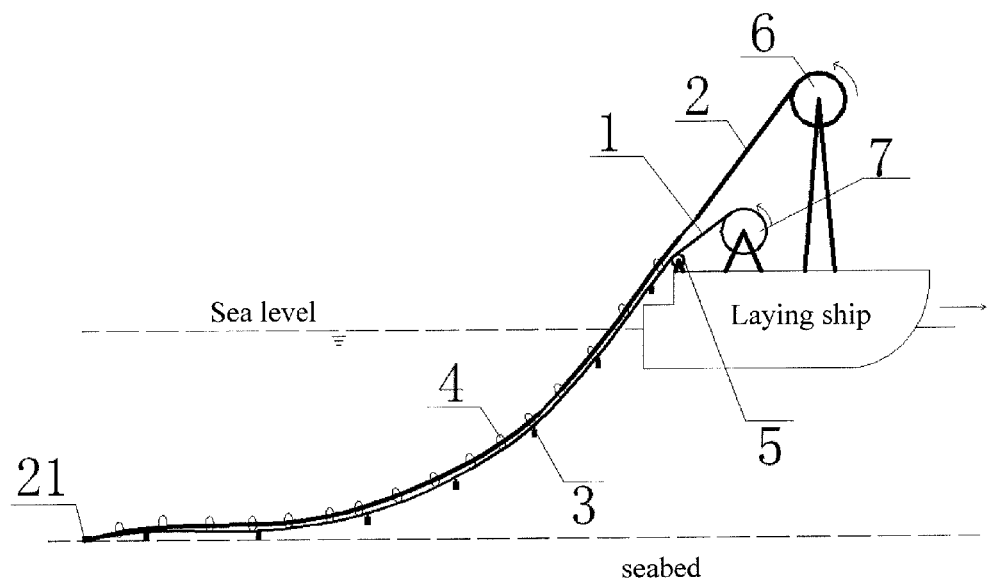
FIG. 6 is a schematic view of the flexible pipe installation and operation according to embodiments of the present invention.

As shown in FIG. 6, the flexible offshore pipeline is installed continuously by laying ship. The cables 1 are wound on the cable control winch 7. The flexible pipe is wound on the flexible pipe control winch 6. The rear of the ship is provided with cable water entry control pulley 5. The detailed operation steps are as follow:

1) installing the flexible pipe connector 21. Pulling a sufficient length of the flexible pipe 2 from the flexible pipe control winch 6, bonding and sleeving the flexible pipe 2 end onto the connecting pipe 211 of the flexible pipe connector 21, sleeving the reinforcing hoops 213 onto the joint area of the flexible pipe 2 and the connecting pipe 211, tightening the bolts on the reinforcing hoops 213 to connect the flexible pipe 2 to the flexible pipe connector 21 to form a complete seal.

2) pulling a sufficient length of the cable 1 from the cable control winch 7, passing the cable 1 through the cable water entry control pulley 5, welding an end of the cable 1 to the flexible pipe connecting pipe 21 of the flexible pipe 2.

3) As the laying ship moving forward, the cable 1 and flexible pipe 2 are slowly laid down into the sea at the same speed by cable control winch 7, flexible pipe control winch 6, and cable water entry control pulley 5. Only when it is necessary to connect the anchorage pier assemblies 3 and the constraining assemblies 4 to the cable 1, the laying ship temporarily halts, and it stops to lay down the cable 1 and the flexible pipe 2. The anchorage pier assemblies 3 are fixed onto the cable 1 at pitch of one at every 5 meters; the constraining assemblies 4 are fixed onto the cable 1 at pitch of one at every 1 meter. The fixing of the anchorage pier assemblies 3 and constraining assemblies 4 is conducted at the tail of the ship and located at the rear side direction of the cable water entry control pulley 5. When installing the anchorage assembly 3, the first clamping tool 31 and the cable 1 are connected, and the anchorage pier assembly 3 is suspended on the cable 2. When installing the constraining assembly 4, a second clamping tool 42 is mounted on the cable 1, and then the constraining belt is surrounded or sleeved on the flexible pipe 2. Finally, another second clamping tool 42 is clamped and mounted to the cable 1.

The embodiment described above is only an example of the present invention; the other technical solutions based on the principle of the present invention belong to the protection scope of the invention. Improvements and modifications based on the principle of the present invention should also be regarded as in the protection scope of the present invention.

The invention claimed is:

1. A flexible offshore pipeline for oil and gas transportation stabilized on seabed by anchorage piers, characterized in that the flexible offshore pipeline comprises a cable and a flexible pipe for oil and gas transportation; wherein a plurality of anchorage pier assemblies to prevent the cable from drifting, and a plurality of constraining assemblies to restrict the flexible pipe are sequentially provided on the cable; and wherein
   each of the anchorage pier assemblies comprises a gravity block and a first clamping tool, the first clamping tool is fixed directly on the gravity block and connects the gravity block with the cable;
   wherein each of the constraining assemblies comprises a constraining belt and second clamping tools on two ends of the belt, the second clamping tool has fixture grooves at the ends of the belt, and each of the constraining assemblies is fixed on the cable through the fixture grooves, each of the constraining assemblies is mounted to the cable, each of the constraining assemblies surrounds the flexible pipe;
   wherein the cable is parallel with the flexible pipeline.

2. The flexible offshore pipeline according to claim 1, characterized in that there are flexible pipe connectors on the ends of the flexible pipe, the flexible pipe connector comprises a connect pipe and reinforcing hoops with bolts, the flexible pipe is bonded onto the connect pipe, and the reinforcing hoops surround the flexible pipe and the connect pipe, there is a flange at the end of the connect pipe for connecting with the flexible pipe.

3. The flexible offshore pipeline according to claim 2, wherein the first clamping tools of the anchorage pier assemblies and the second clamping tools of the constraining assemblies connect with the same cable.

4. The flexible offshore pipeline according to claim 3, wherein the cable is a steel cable; wherein the flexible pipe is a plastic pipe, a rubber pipe or a pipe formed by enmeshing a high strength fiber on a plastic material and the high strength fiber is carbon fiber, glass fiber, or aramid fiber; wherein the constraining belt is a steel rope or a fiber rope; wherein the gravity block is a concrete block or a container filled with stone or sand; and wherein the steel cable and steel cable are treated to be resistant to through coating or cathodic protection.

\* \* \* \* \*